United States Patent
Farhan et al.

(10) Patent No.: US 6,449,071 B1
(45) Date of Patent: Sep. 10, 2002

(54) DIGITAL SIGNAL PROCESSING OPTICAL TRANSMITTER

(75) Inventors: Forrest M. Farhan, Alpharetta, GA (US); Graham Mobley, Dunwoody, GA (US); Donald Sipes, Crystal Lake, IL (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/493,045

(22) Filed: Jan. 27, 2000

Related U.S. Application Data

(63) Continuation-in-part of application No. 09/102,344, filed on Jun. 22, 1998.

(51) Int. Cl.[7] .......................... H04J 14/02; H04J 14/08; H04B 10/04; H04B 10/20; H04N 7/173
(52) U.S. Cl. ................... 359/125; 359/118; 359/137; 359/180; 359/123; 359/188; 725/127; 725/128
(58) Field of Search ...................... 359/180, 187, 359/188, 118, 125, 137; 725/119, 120, 121, 116, 118, 127, 128, 149

(56) References Cited

U.S. PATENT DOCUMENTS

| | | | |
|---|---|---|---|
| 3,995,120 A | 11/1976 | Pachynski, Jr. ............ 179/15 |
| 4,759,018 A | 7/1988 | Buchner ..................... 370/112 |
| 5,018,142 A | 5/1991 | Simcoe et al. ............. 370/112 |
| 5,420,583 A | 5/1995 | Knecht ........................ 341/59 |
| 5,426,527 A * | 6/1995 | Steen et al. ................ 359/123 |
| 5,563,815 A | 10/1996 | Jones ......................... 364/721 |
| 5,644,622 A * | 7/1997 | Russell et al. ............. 455/422 |
| 5,786,919 A * | 7/1998 | Habboosh et al. ......... 359/135 |
| 5,953,668 A * | 9/1999 | Reilly ......................... 455/442 |

* cited by examiner

*Primary Examiner*—Jason Chan
*Assistant Examiner*—M. R. Sedighian
(74) *Attorney, Agent, or Firm*—Hubert J. Barnhardt, III; Kenneth M. Massaroni; Shelley L. Couturier

(57) ABSTRACT

A node (200) for receiving analog signals transmitted within a broadband communication system (100) includes a summer (205) for summing the analog signals to generate a summed analog signal and an analog-to-digital (A/D) converter (210) coupled to the summer (205) for converting the summed analog signal into a digital electrical signal. The node (200) also includes a digital signal processor (DSP) (220) coupled to the A/D converter (210) for filtering the digital electrical signal in accordance with a filter algorithm to generate a filtered digital signal. The DSP (220) including a control port for receiving a control signal (215) indicative of the filter algorithm that is to be used. The filtered signal is then transmitted upstream within the system (100) by a transmitter (240) coupled to the DSP (220).

15 Claims, 7 Drawing Sheets

100

DIGITAL SIGNAL PROCESSING OPTICAL TRANSMITTER

This application is a CIP of Ser. No. 09/102,344 filed Jun. 22, 1998.

FIELD OF THE INVENTION

This invention relates generally to fiber optic communications and, more specifically, to signal processing optical transmitters for use in fiber optic communication systems.

BACKGROUND OF THE INVENTION

Conventional communication systems, such as cable television systems and other broadband network systems, are designed for the distribution of video signals from a main transmitting station (commonly referred to as the "head end") to subscribers in a local service area. At the head end station, video information is received from satellite transmitters and demodulated for retransmission through fiber optic cables to a number of nodes. Hardware assemblies within each node are designed to receive the optical signal transmitted by the head end station and retransmit the information as a radio frequency (RF) signal to individual cable subscribers. A tree-and-branch architecture, complete with necessary RF amplifiers, is used to distribute the signals from the nodes to each subscriber.

While this architecture is adequate for the distribution of conventional television video signals to a large number of users, there is currently a desire to provide additional services that may include telephony, high definition digital television, and two-way digital service, which could include Internet connectivity. In order to address these requirements, the portion of the RF spectrum below 750 MHz can be subdivided into three bands, each fulfilling a different communication function. For example, the region from 50–550 MHz could carry conventional analog television signals. Assuming a 6 MHz channel spacing, eighty analog television channels could be transmitted within this frequency window. In addition, digital channels could occupy the 550–750 MHz band, and the 5–40 MHz region could be allocated for reverse channels, i.e., could be allocated for the transmission of return signal upstream from the subscriber to the head end.

While the transmission architectures needed for distributing analog and/or digital information from a central station to many subscribers is well known, there are a number of technical problems that much be addressed before the reverse transmission channel is feasible. It is known that analog links in the 5–40 MHz window that are designed to connect many subscribers to a single node are vulnerable to RF noise problems. Since noise signals from the many subscriber locations are summed at the RF/optical node, it is possible to saturate the receiver with the accumulated noise. In the most extreme case, it is possible for a single, high noise subscriber to drown out the signals from others connected to the same node. Unfortunately, there are many common noise sources in the 5–40 MHz band. These include CB radios, motor noise, etc. Filtering out these sources and/or designing an analog reverse transmission system that is immune to them is difficult and expensive.

U.S. patent application Ser. No. 09/102,344 to Farhan et al., entitled "Digital Optical Transmitter" and assigned to the assignee hereof, describes a reverse transmission architecture to address these problems, and the teachings of Farhan are hereby incorporated by reference. According to Farhan, information from each subscriber location is transmitted from the subscriber to the RF/optical node using an RF modulation format that has a high level of noise immunity. Quadrature phase shift keying (QPSK) is one example of such a format that offers significant improvements with respect to conventional analog formats. Specifically, the signal-to-noise ratio required for QPSK transmission is roughly half that required for analog modulation.

At the node, the reverse signals from many subscribers are summed in an RF combiner and converted to a digital format using a conventional analog-to-digital (A/D) converter. According to Farhan, this signal may be combined with a digital pilot tone, converted from a parallel to a serial bit stream, and subsequently used to modulate a laser diode. The output of this diode is transmitted by fiber optic cable to the head end receiver. Fiber optic amplifiers may optionally be placed between the node and the head end to overcome optical fiber losses.

In Farhan, the basic noise issues associated with subscriber-to head end transmission are addressed, but hardware analog filters must be built into the RF receiver at the node when it is initially installed. Changes in the number of subscribers served by the node or changes in other features in the subscriber-to-node leg of the reverse link must be anticipated in the initial receiver design or achieved through hardware modification. These solutions can be difficult and expensive.

In current nodes, return signals may also be difficult to channelize. In many cases, several types of information with different bandwidth requirements are included in the return signal. For example, a typical home subscriber might generate set-top controller signals with low information content, voice telephony signals with medium amounts of information content, and digital modem signals with high information density. In an ideal case, the signal leaving the node would be a combination of different modulation formats, each selected to most efficiently handle a particular type of data signal. However, separation of these signals at the node and efficient retransmission to the head end cannot be performed using known communication system architectures. Additionally, data compression, which would be advantageous in situations in which multiple inputs are to be multiplexed onto a single output line, is difficult using prior art techniques.

DETAILED DESCRIPTION OF A PREFERRED EMBODIMENT

Figure 1:
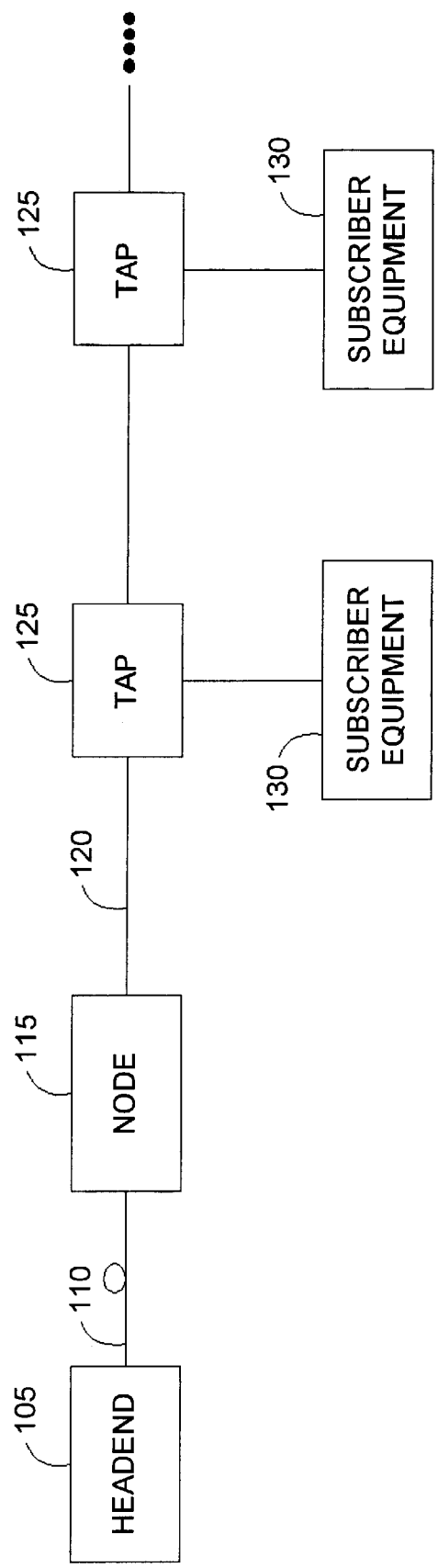
FIG. 1 is a block diagram of a broadband network embodying a digital signal processing node according to the present invention.

FIG. 1 shows a communication system, such as a broadband network 100 having both forward and reverse paths, i.e., having the ability to communicate downstream in the forward direction and upstream in the reverse direction. The broadband network 100, which can be a cable television system, includes a head end transceiver 105 for receiving satellite signals and demodulating them to baseband or an intermediate frequency (IF). The demodulated signal is then converted to cable television signals that are routed throughout the system 100 to subscriber equipment 130, such as set-top decoders, televisions, or computers, located in the residences or offices of system subscribers. The head end 105 may, for example, convert the baseband signal to an optical signal that is transmitted over fiber optic cable to a remotely located node 115 that converts the optical signal to an electrical RF signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100 also has reverse transmission capability so that signals, such as data, video, or voice signals, generated by the subscriber equipment 130 can be provided back to the head end 105 for processing. The reverse signals travel through the taps 125 and any nodes 115 another cable television equipment, e.g., reverse amplifiers, to the head end 105. In the configuration of FIG. 1, RF signals generated by the subscriber equipment 130 travel to the node 115, which converts the RF signals for transmission over the fiber optic cable 110 to the head end 105.

Figure 2:
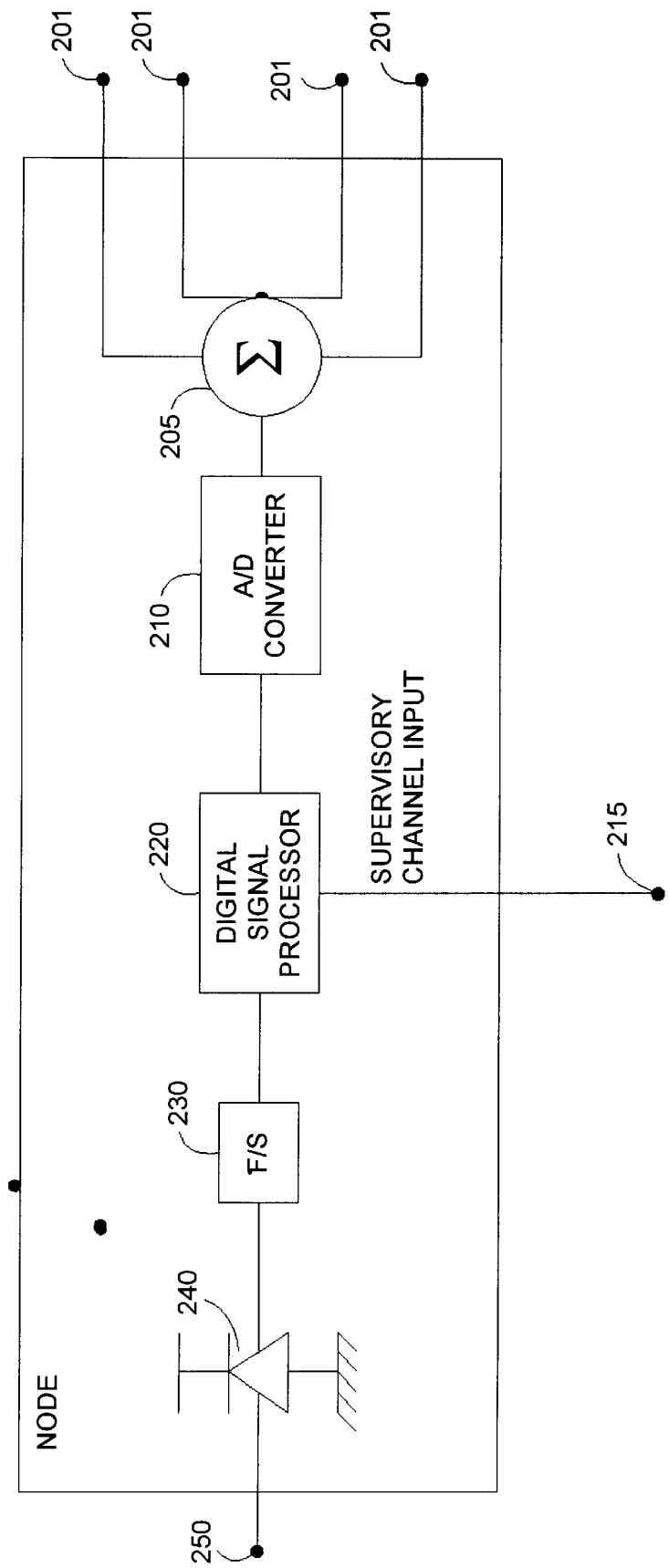
FIG. 2 is a block diagram of the digital signal processing node of the present invention.

In prior art systems, the node 115 functions primarily to convert optical signals to RF signals in the downstream direction and to convert RF signals to optical signals in the reverse, or forward, direction. FIG. 2 shows an improved nodal transceiver, or node 200, according to the present invention. In this device, multiple RF input lines 201 from the subscriber equipment are combined in a summing amplifier 205. The analog output of this amplifier 205 is converted to a digital format by the analog-to-digital (A/D) converter 210. Output lines from the A/D converter 210 are connected to a digital signal processor 220, which is controlled from the system head end via a supervisory channel. Signals over the supervisory channel are received at control input 215. The digital signal processor 220 is designed to allow various parameters, such as filter bandwidth and center frequency, to be changed via the supervisory channel input 215. Digital data leaving the processor 220 is configured for optical transmission by a serializing and frame unit 230, the output of which drives the laser transmitter 240. The modulated optical output of the laser diode 240 is transmitted via an output port 250 over fiber optic cable to the head end of the system.

According to the present invention, the digital signal processor 220 can be advantageously employed to filter signals, thus eliminating residual noise in the output of the A/D converter 210. Such noise may be present on the input ports 201 due to RF sources such as CB radios, electrical motors, etc. The exact spectrum of the reverse information signal and the noise sources is dependent on the location and architecture of the subscriber distribution system. For example, input signals from a few subscribers may occupy a narrow region of the available input spectral bandwidth. In this case, it would be advantageous to restrict the noise input to the system by filtering out those bands of the input frequency spectrum that are known to have no usable information content. During the lifetime of the node 200, it is possible for the architecture and design of the subscriber distribution system to change significantly. For example, as the community of subscribers grows, one would expect the number of inputs into the node 200 to increase until the maximum capacity of the node 200 is reached. Alternatively, changes in the number of inputs may also accompany a decision to run optical fiber links deeper into the subscriber network, in which case, the number of subscribers per node would decrease with increasing fiber depth.

A primary advantage of the node 200 having the digital signal processor 220 is the ability to change, via control by the head end, the filter algorithm that is applied to data received by the node 200. As new subscribers are added to the system or the characteristics of the input noise spectrum changes, programming commands can be downloaded from the head end using the supervisory channel input 215. This feature of the node 200 results in decreased labor and hardware costs relative to prior art configuration methods in which analog filter circuits are physically replaced.

The node 200 could also be programmed directly, rather than via commands supplied by the head end. For instance, a technician could couple a programming unit directly to the control input 215 of the node 200 to download appropriate commands for programming the digital signal processor 220. Devices and methods for programming digital signal processors are known in the art, and such devices can be included in the head end 105 or in a separate programming unit. When coupled to the head end 105 for programming, the supervisory channel of the node 200 could include a dedicated wireline, an over-the-air channel (in which case a radio receiver would be included in the node 200), a particular frequency of the forward communication channel, or any other means for conveying control information.

Figure 3:
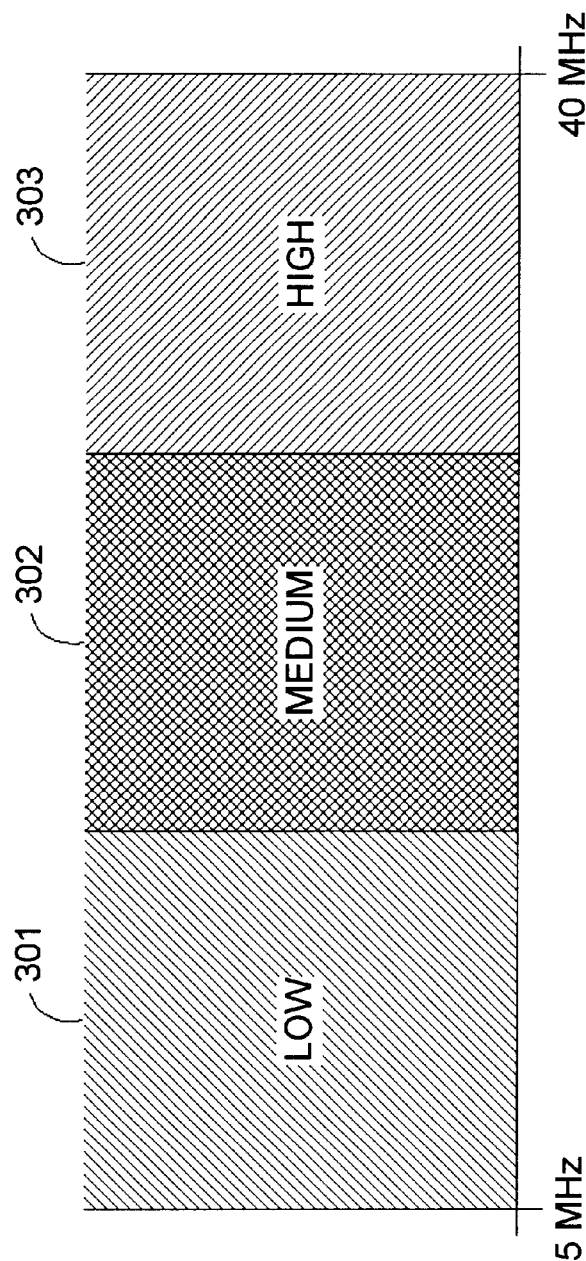
FIG. 3 is a diagram showing a typical channelization scheme for the reverse signal that is processed by the node of FIG. 2 according to the present invention.

The digital signal processor 220 can also be used to recognize and separate different types of input data. Referring to FIG. 3, reverse spectrum is shown as divided into three bands, or channels. A low information content channel 301, which could occupy the 5–15 MHz band, includes transmissions from cable television set-top devices; a medium information content channel 302 carries voice telephony information; and a high information content channel 303 can carry a data stream transmitted by a cable modem, for instance. The three different data types are assigned to different frequency bands within the reverse signal spectrum. In order to efficiently transmit this information to the head end, the node 200 uses modulation formats that are matched to the source information density.

To accomplish this task, the digital signal processor 220 separates the incoming data according to its source. Data with low information content is then coded for transmission using, for instance, a 4-bit data stream. Higher information content signals are coded with words of greater lengths, e.g., 6 bits and 8 bits. This scheme reduces the data rate required to transmit the reverse signal information to the head end.

By way of example, a priori knowledge of how to separate and demodulate the incoming data can be sent via the supervisory channel 215. Alternatively, specific interleaved bits of the signal, when recombined, could always be demodulated in a particular way or signals from the node 200 could include header information (not shown) that indicates the correct demodulation scheme. Other methods for conveying information on signal decoding and demodulation could also be shared between the node 200 and the headend 105.

Figure 4:
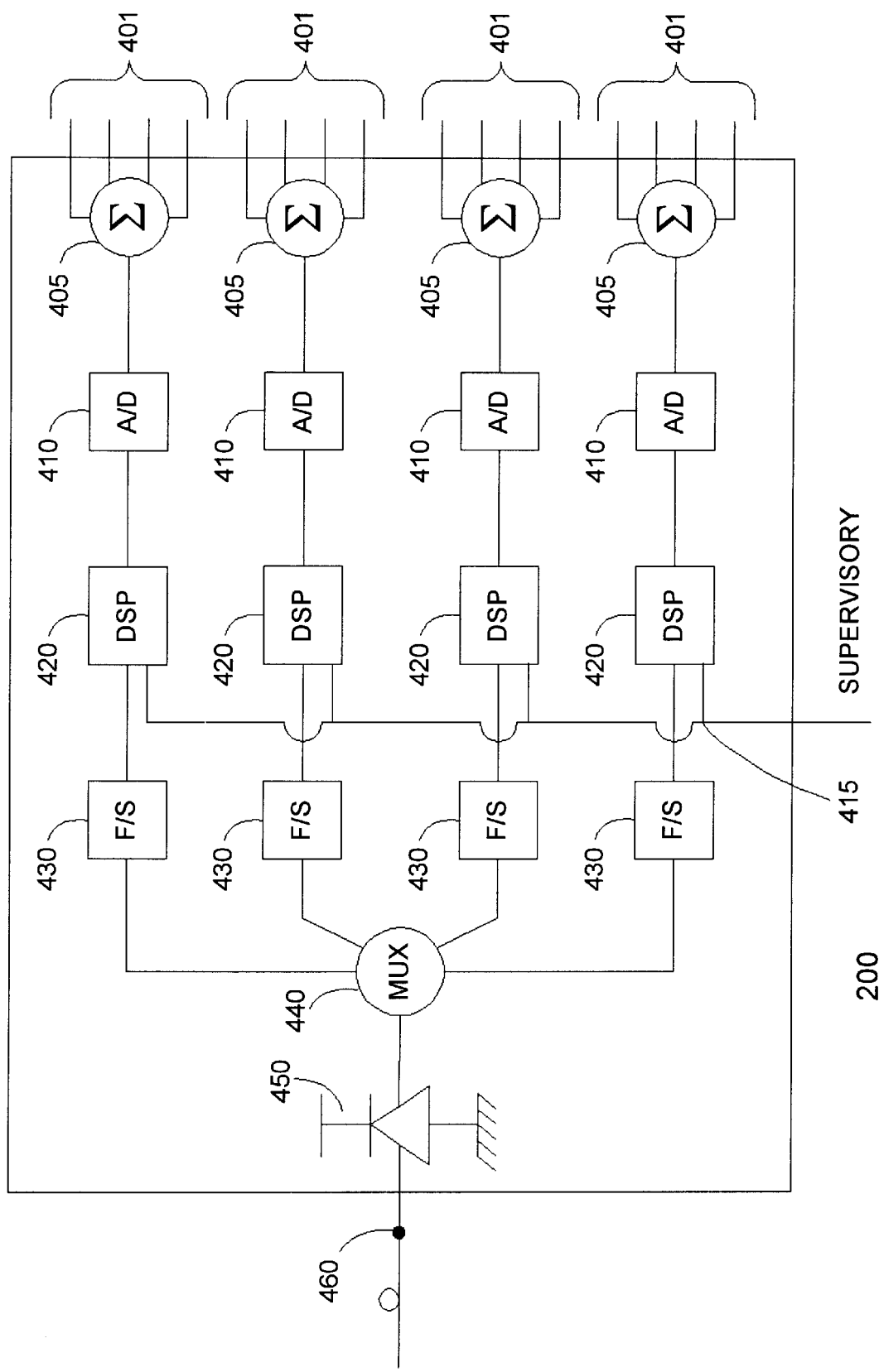
FIG. 4 is an electrical block diagram of a digital signal processing node according to a first embodiment of the present invention.

FIG. 4 depicts an input multiplexing embodiment of the node 200. In the node 200, reverse signals are received at input ports 401 and summed by respective summing amplifiers 405. A/d converters 410 translate the individual input signals into digital data streams that are provided to digital signal processors 420, each of which is coupled to the control line 415. Output data from the processors 420 is serialized and framed by framing circuitry 430 into a format that permits combination by a multiplexer 440 before transmission to the output port 460 by the modulated laser diode 450.

The signal processors 420 compress the input data for more efficient multiplexing using algorithms known in the art. In addition, the processors 420 can perform the filtering and channelization functions described above. By compressing the input data, it is possible to transmit the reverse information received by the summing amplifiers 405 using a single optical fiber. Furthermore, the data compression algorithms, filter transfer functions, and channelization schemes can all be changed directly or from a remote location using the control line 415.

Figure 5:
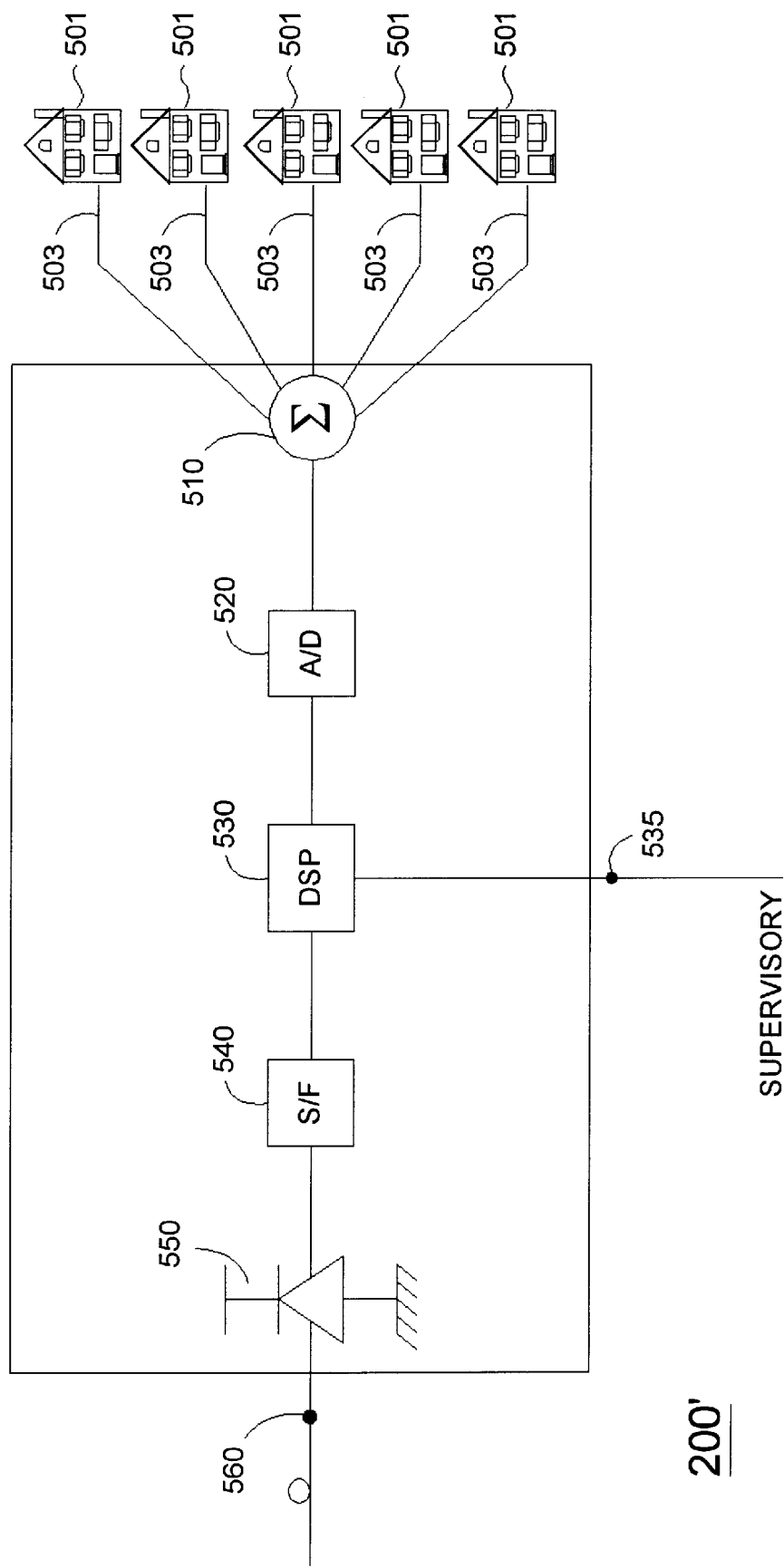
FIG. 5 is an electrical block diagram of a digital signal processing node according to a second embodiment of the present invention.

FIG. 5 depicts a node 200' configured in accordance with an alternative embodiment of the present invention. In node 200', RF signals supplied on input ports 503 are generated by subscriber equipment 501 and are connected to the node 200' in a star configuration in which a single node is coupled to a plurality of branches for further signal distribution. At any one point in time, the number of active input lines may vary from none to all. A summing receiver 510 combines the RF reverse signals to generate an analog output that is digitized by an A/D converter 520. A digital signal processor 530, under control of a supervisory channel provided at control input 535, performs a real-time multiplexing function in addition to optional filter and/or channelization functions, as described previously. The digital signal processor 530 provides an output to a serializing and framing unit 540 that produces a serial data stream suitable for modulating an optical diode 550. The modulated diode laser output is transmitted to an optical output 560 for transmission over an optical communication channel to the head end.

The real-time multiplexing function minimizes the amount of data transmitted to the head end by conveniently eliminating channels that contain no information. In the absence of this function, a dead input would be represented by a string of zeros, thereby increasing the reverse link data rate without transmitting information. The real-time multiplexing processor 530 can dynamically change its output format in response to changes in the return signal density.

Figure 6:
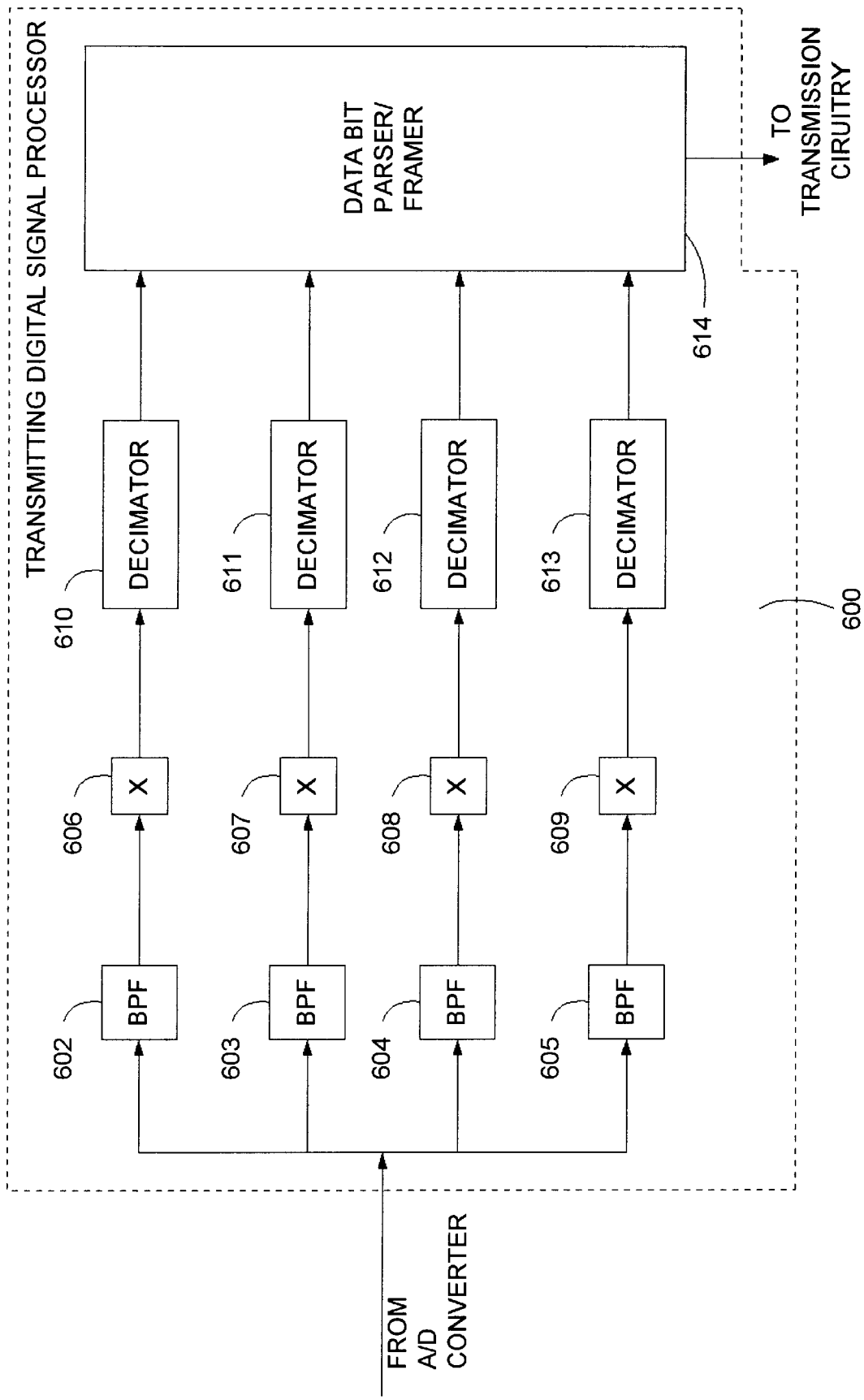
FIG. 6 is an electrical block diagram of a digital signal processor that can be used in a digital signal processing node in accordance with the present invention.

FIG. 6 shows an example of a digital signal processor 600 that can be used with any of the digital signal processing nodes described herein. In accordance with a preferred embodiment of the present invention, this more detailed example of the digital signal processor 600 achieves selective application of data to specific transmission frequency bands.

The digital signal processor 600 receives data from the A/D converter (as shown in FIGS. 2, 4, and 5), which samples an incoming cable television (CATV) frequency band in the range of 5 MHz to 40 MHz at a frequency at or above the Nyquist sampling rate. In the example, a sampling frequency of 100 Ms/second is used by the A/D converter. The A/D converter output is connected to four bandpass filters 602–605 that have center frequencies of 10 MHz, 20 MHz, 30 MHz, and 40 MHz respectively, and that selectively pass frequencies lying within +/−5 MHz of the respective center frequencies.

The filters 602–605 are designed to overlap at their respective 6-db frequencies. For example, filter 602 can have a 6-db attenuation frequency of 15 MHz, filter 603 can have 6-db attenuation frequencies of 15 MHz and 25 MHz, filter 604 can have 6-db attenuation frequencies of 25 MHz and 35 MHz, and filter 605 can have 6-db attenuation frequencies of 35 MHz and 45 MHz. Filter 602 is designed specifically to pass frequencies down to 5 MHz without significant attenuation.

Also, each filter 602–605 is designed with the same flat delay. The net result of the matching overlap and equal delay is that each bandpass filters 602–605, either separately or in combination with the others, accurately represents the input signal even if a specific signal occupies a band that is shared by two or more bandpass filters.

Next, the output of each filter 602–605 is multiplied by a complex rotator 606–609 having a rotation frequency that matches the center frequency of its corresponding filter. The rotator 606–609 performs complex down-conversion, which is a conventional process, and allows the center frequency of each band to be down-converted to DC with no loss of information. Because the resulting signal yielded by the complex down-conversion is band-limited to +/−5 MHz about DC, the sampling rate of each channel can be reduced from 100 Ms/sec down to 10 Ms/sec, which corresponds to a 10-to-1 decimation. A conservative reduction would be 6-to-1, or 16.67 Ms/sec, and is accomplished by 6-to-1 decimation in decimators 610–613. Nominally, the precision from each decimation is 12 bits. Since each output is 16.67 Ms/sec, the composite data rate from all filters 602–605 would be 16.67 Ms/sec*12 bits/sample/output*4 outputs= 800 Mb/sec.

Note that the input A/D converter provides 12 bit precision at 100 Ms/sec, which corresponds to a 1200 Mb/sec data rate. Therefore, a data reduction from 1200 to 800 Mb/sec has been performed without any further processing. To achieve additional data reduction, a programmable input to a data bit parser/framer 614 can assign varying degrees of precision ranging from 0 bits per channel to 12 bits per channel. For example, any 10 MHz band that does not contain signals would have no bits assigned, while channels that contain large amounts of 256-QAM traffic would be assigned 12 bit precision. The framer 614 can provide header information that would be used by a receiving device, such as a headend, to decode the correct number of bits per channel. It will be appreciated that, according to this example, additional framing within the node may be unnecessary.

A typical bit assignment is illustrated next. If the maximum payload rate were set at 600 Mb/sec, the average bits per channel would be 600/16.67/4 =9 bits/sample/channel, or 36 bits in total. If two channels were assigned 12 bit precision each, the remaining payload would be 36–24, which corresponds to 12 bits over two channels or 6 bits per channel. If, for example, one channel contained no signals, the total of the remaining 12 bits could all be applied to another channel.

Figure 7:
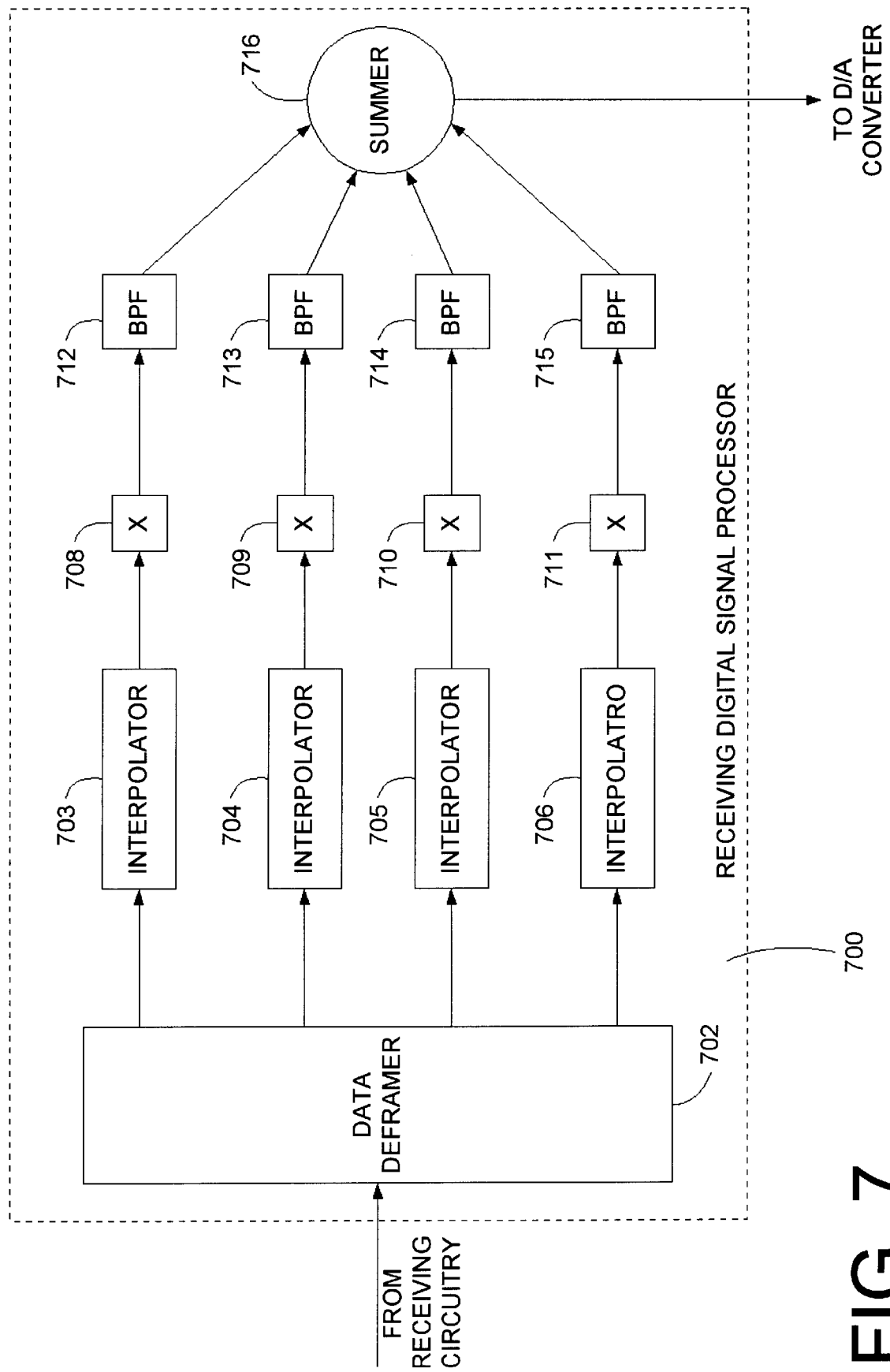
FIG. 7 is an electrical block diagram of a digital signal processor that can be used in a receiving device in accordance with the present invention.

Referring next to FIG. 7, the signal is reconstructed by a similar digital signal processor 700 included within a receiving device. The receiving digital signal processor 700 includes a deframer 702 and interpolators 703–706 for interpolating each received channel. The signal on each channel is then supplied to a complex rotator 708–711 that translates the received signal to the appropriate center frequency. Next, bandpass filters 712–715 provide proper filtering similar to that provided by the transmit filters 602–605. The resulting signals are then added together by the summer 716 and provided to an D/A converter for conversion back to an analog signal.

Other embodiments and modifications of this invention may occur to one of ordinary skill in the art in view of these teachings. For example, the real-time multiplexing function may be performed by each of the digital signal processors 430 in the node 200 of FIG. 4. Additionally, filter transfer functions may also be changed in real time to reflect changing noise conditions on the RF input lines or the amount and/or type of return signal data received by the node. Therefore, this invention is limited only by the following claims, which include all such embodiments and modifications when viewed in conjunction with the above specification and the accompanying drawings.

What is claimed is:

1. A node for receiving analog signals transmitted within a broadband communication system, the node comprising:

a summer for summing the analog signals to generate a summed analog signal;

an analog-to-digital (A/D) converter coupled to the summer for converting the summed analog signal into a digital electrical signal;

a digital signal processor (DSP) coupled to the A/D converter for filtering the digital electrical signal in accordance with a filter algorithm to generate a filtered digital signal, the DSP including a control port for receiving a control signal indicative of the filter algorithm that is to be used, wherein the control signal programs various processing parameters of the DSP, and wherein the filter algorithm specifies center frequency and bandwidth of a filter used by the DSP to process the digital electrical signal; and a transmitter coupled to the DSP for transmitting the filtered digital signal within the broadband communication system.

2. The node of claim 1, wherein the control signal is provided to the node over a supervisory channel.

3. The node of claim 1, further comprising:

a serializing and frame unit for serializing and framing the filtered digital signal; and an optical transmitter for transmitting the filtered digital signal as a digital optical signal.

4. The node of claim 1, wherein the analog signals are transmitted to the node at multiple frequencies, and wherein the DSP modulates the digital electrical signal using a plurality of digital modulation formats, each corresponding to a different frequency range.

5. The node of claim 4, wherein the use of different digital modulation formats is specified by information contained in the control signal.

6. The node of claim 1, wherein the node is located within a reverse path of the broadband communication system.

7. A broadband communication system having a forward, downstream path and a reverse, upstream path, the broadband communication system comprising:

subscriber equipment for generating reverse analog signals that are transmitted upstream within the broadband communication system;

a node for receiving the reverse analog signals, the node comprising:

a summer for summing the reverse analog signals to generate a summed analog signal;

an analog-to-digital (A/D) converter coupled to the summer for converting the summed analog signal into a digital electrical signal;

a digital signal processor (DSP) coupled to the AID converter for filtering the digital electrical signal in accordance with a filter algorithm to generate a filtered digital signal, the DSP including a control port for receiving a control signal indicative of the filter algorithm that is to be used; and a transmitter for transmitting the filtered digital signal upstream, wherein the filtered digital signal is representative of the reverse analog signals; and a control device located upstream from the subscriber equipment and the node for receiving and processing the filtered digital signal, wherein the control device generates the control signal.

8. The broadband communication system of claim 7, wherein the control device comprises a cable television system headend.

9. The broadband communication system of claim 7, further comprising:

an electrical communication medium coupling the subscriber equipment and the node; and an optical communication medium coupling the node and the control device.

10. The broadband communication system of claim 7, wherein the control signal programs various processing parameters of the DSP within the node.

11. The broadband communication system of claim 10, wherein the control signal is provided to the node over a supervisory channel that couples the node to the control device.

12. The broadband communication system of claim 10, wherein the node further comprises:

a serializing and frame unit for serializing and framing the filtered digital signal; and an optical transmitter for transmitting the filtered digital signal as a digital optical signal that is received by the control device.

13. The broadband communication system of claim 10, wherein the filter algorithm specifies center frequency and bandwidth of a filter used by the DSP to process the digital electrical signal.

14. The broadband communication system of claim 10, wherein the reverse analog signals are transmitted to the node at multiple frequencies, and wherein the DSP modulates the digital electrical signal using a plurality of digital modulation formats, each corresponding to a different frequency range.

15. The broadband communication system of claim 14, wherein the use of different digital modulation formats is specified by information contained in the control signal.

* * * * *

UNITED STATES PATENT AND TRADEMARK OFFICE
CERTIFICATE OF CORRECTION

PATENT NO.   : 6,449,071 B1                                                   Page 1 of 1
DATED        : September 10, 2002
INVENTOR(S)  : Farhan et al.

It is certified that error appears in the above-identified patent and that said Letters Patent is hereby corrected as shown below:

Column 8,
Line 8, delete "AID" and insert therefore -- A/D --

Signed and Sealed this

Twentieth Day of May, 2003

JAMES E. ROGAN
*Director of the United States Patent and Trademark Office*